US008873249B2

(12) United States Patent
Bandholz et al.

(10) Patent No.: US 8,873,249 B2
(45) Date of Patent: Oct. 28, 2014

(54) DIMM RISER CARE WITH AN ANGLED DIMM SOCKET AND A STRADDLE MOUNT DIMM SOCKET

(75) Inventors: Justin P. Bandholz, Cary, NC (US); Brian M. Kerrigan, Cary, NC (US); Edward J. McNulty, Raleigh, NC (US); Pravin Patel, Cary, NC (US); Peter R. Seidel, Cary, NC (US); Philip L. Weinstein, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 13/439,221

(22) Filed: Apr. 4, 2012

(65) Prior Publication Data

US 2012/0194992 A1    Aug. 2, 2012

Related U.S. Application Data

(63) Continuation of application No. 12/644,558, filed on Dec. 22, 2009, now Pat. No. 8,199,515.

(51) Int. Cl.
*H05K 1/11* (2006.01)
*G06F 1/18* (2006.01)

(52) U.S. Cl.
CPC ..................................... *G06F 1/185* (2013.01)
USPC ................. 361/803; 361/796; 710/2; 710/31; 710/62; 710/301; 711/1; 711/103; 711/105; 711/154; 439/326

(58) Field of Classification Search
USPC .................. 361/803, 796; 710/2, 31, 62, 301; 711/1, 103, 105, 154; 439/326
See application file for complete search history.

(56) References Cited

U.S. PATENT DOCUMENTS

| | | | | |
|---|---|---|---|---|
| 4,244,032 A | * | 1/1981 | Oliver ........................... | 711/103 |
| 4,686,506 A | * | 8/1987 | Farago ........................... | 341/100 |
| 4,942,391 A | * | 7/1990 | Kikuta ........................... | 345/634 |
| RE33,380 E | * | 10/1990 | Cheng-Quispe et al. ..... | 375/220 |
| 5,517,407 A | * | 5/1996 | Weiner .......................... | 704/1 |
| 5,946,301 A | * | 8/1999 | Swanson et al. .............. | 370/252 |
| 6,004,139 A | * | 12/1999 | Dramstad et al. .............. | 439/59 |
| 6,202,110 B1 | * | 3/2001 | Coteus et al. .................. | 710/301 |
| 6,356,959 B1 | * | 3/2002 | Thomas et al. ................. | 710/2 |

(Continued)

OTHER PUBLICATIONS

Notice of Allowance, U.S. Appl. No. 12/644,558, Feb. 7, 2012, pp. 1-11.

*Primary Examiner* — Xiaoliang Chen
(74) *Attorney, Agent, or Firm* — Edward J. Lenart; Katherine S. Brown; Biggers Kennedy Lenart Spraggins LLP

(57) ABSTRACT

A DIMM riser card that includes a PCB having a first edge, a second edge, and one or more faces. The first edge of the PCB is configured for insertion into a main board DIMM socket. The first edge includes electrical traces that electrically couple to a memory bus. The DIMM riser card includes an angled DIMM socket mounted on one face of the PCB, where the angled DIMM socket is configured to accept a DIMM at an angle not perpendicular to the PCB and electrically couple the DIMM to the memory bus. The DIMM riser card includes a straddle mount DIMM socket mounted on the second edge of the PCB. The straddle mount DIMM socket is configured to accept a DIMM and electrically couple the DIMM to the memory bus through the electrical traces on the first edge of the PCB.

11 Claims, 5 Drawing Sheets

(56) References Cited

U.S. PATENT DOCUMENTS

| | | |
|---|---|---|
| 6,363,450 B1 | 3/2002 | Lash et al. |
| 6,545,895 B1 | 4/2003 | Li et al. |
| 6,567,870 B1 * | 5/2003 | Thomas et al. ............... 710/62 |
| 7,327,151 B2 * | 2/2008 | Kang ..................... 324/756.02 |
| 7,429,788 B2 | 9/2008 | Clayton et al. |
| 7,509,532 B2 * | 3/2009 | Co et al. ......................... 714/25 |
| 8,335,894 B1 * | 12/2012 | Rajan et al. ................... 711/154 |
| 8,539,145 B1 * | 9/2013 | Warnes et al. ............... 711/105 |
| 2003/0007442 A1 * | 1/2003 | Henrichs ........................ 369/95 |
| 2004/0092148 A1 * | 5/2004 | Yu ................................ 439/326 |
| 2005/0044302 A1 * | 2/2005 | Pauley et al. ..................... 711/1 |
| 2005/0105350 A1 * | 5/2005 | Zimmerman ................. 365/201 |
| 2006/0198114 A1 * | 9/2006 | Coutancier et al. ........... 361/788 |
| 2006/0242468 A1 * | 10/2006 | Kang ............................. 714/42 |
| 2007/0015381 A1 * | 1/2007 | Muff et al. ...................... 439/74 |
| 2007/0212920 A1 | 9/2007 | Clayton et al. |
| 2008/0096412 A1 * | 4/2008 | Poh et al. ...................... 439/326 |
| 2008/0101051 A1 * | 5/2008 | Middleton et al. ............ 361/796 |
| 2011/0149499 A1 | 6/2011 | Bandholz et al. |

* cited by examiner

```
┌─────────────────────────────────────────────────────────────────────┐
│ Configure A Printed Circuit Board ('PCB') Having A First Edge, A Second Edge, And One Or More │
│ Faces For Insertion Into A Main Board DIMM Socket Mounted On A Main Board Including Etching │
│ Electrical Traces Along The First Edge That Couple To A Memory Bus Upon Insertion Into The Main │
│                         Board DIMM Socket 502                        │
└─────────────────────────────────────────────────────────────────────┘
                                    │
                                    ▼
┌─────────────────────────────────────────────────────────────────────┐
│ Mount To The Second Edge Of The PCB A Straddle Mount DIMM Socket, The Straddle Mount DIMM │
│   Socket Configured To Accept A DIMM And Electrically Couple The DIMM To The Memory Bus │
│             Through The Electrical Traces On The First Edge Of The PCB 506 │
└─────────────────────────────────────────────────────────────────────┘
                                    │
                                    ▼
┌─────────────────────────────────────────────────────────────────────┐
│ Mount On One Side Of The PCB An Angled DIMM Socket, The Angled DIMM Socket Configured To │
│ Accept A DIMM At An Angle Not Perpendicular To The PCB And Couple The DIMM To The Memory │
│                  Bus Through The Electrical Traces Of The First Edge │
│                                   504                                │
│  ┌───────────────────────────────────────────────────────────────┐  │
│  │ Mount The Angled DIMM Socket Adjacent To A Straddle Mount DIMM Socket To │  │
│  │    Reduce Stub Effect Induced By Electrical Traces Between The Angled DIMM │  │
│  │  Socket And The Straddle Mount DIMM When No DIMM Is Installed In The Straddle │  │
│  │                       Mount DIMM Socket 510                    │  │
│  └───────────────────────────────────────────────────────────────┘  │
│  ┌──────────────────────────────┐  ┌──────────────────────────────┐ │
│  │ Mount The Angled DIMM Socket To │  │ Mount The Angled DIMM Socket To │ │
│  │   Accept A DIMM At An Angle That │  │   Accept A DIMM At An Angle That │ │
│  │  Directs The DIMM Toward The First │  │   Directs The DIMM Toward The │ │
│  │        Edge Of The PCB 512        │  │    Second Edge Of The PCB 514 │ │
│  └──────────────────────────────┘  └──────────────────────────────┘ │
└─────────────────────────────────────────────────────────────────────┘
                                    │
                                    ▼
┌─────────────────────────────────────────────────────────────────────┐
│ Mount To The PCB A Chip Select Connector, The Mounted Chip Select Connector Coupled To One │
│ Or More DIMMs Installed On The DIMM Riser Card, The Chip Select Connector Capable Of Receiving │
│ A Chip Select Cable, The Chip Select Cable Coupling One Or More Chip Select Signal Lines Of The │
│  Main Board To A DIMM Installed On The DIMM Riser Card Through The Chip Select Connector 508 │
└─────────────────────────────────────────────────────────────────────┘
```

FIG. 5

DIMM RISER CARE WITH AN ANGLED DIMM SOCKET AND A STRADDLE MOUNT DIMM SOCKET

CROSS-REFERENCE TO RELATED APPLICATION

This application is a continuation application of and claims priority from U.S. patent application Ser. No. 12/644,558, filed on Dec. 22, 2009.

BACKGROUND OF THE INVENTION

1. Field of the Invention

The field of the invention is data processing, or, more specifically, Dual In-line Memory Module ('DIMM') riser cards, computer systems configured with DIMM riser cards, and methods of manufacturing DIMM riser cards.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today increasingly require a greater amount of computer memory to operate. DIMM riser cards are utilized to extend the memory bus of a computer and increase the number of memory chips which may be installed in a computer mother board DIMM socket, without re-designing the mother board. Current DIMM riser cards have several drawbacks however. First, current DIMM riser cards have a large effective width prohibiting many mother boards from utilizing the riser cards. Specifically, DIMM sockets on a typical motherboard are placed near one other at a distance that less than the effective width of a riser card. As such, in many computer systems two riser cards cannot typically be placed in adjacent DIMM sockets, limiting the usefulness of such riser cards. Further, the current DIMM riser cards typically have substantially long electrical traces between upstream and downstream sockets on the card. When the downstream socket is empty—containing no DIMM—the traces act as stub antennae and introduce stub effect into electrical signals transmitted along the memory bus.

SUMMARY OF THE INVENTION

Dual In-line Memory Module ('DIMM') riser cards, computer systems configured with DIMM riser cards, and methods of manufacturing DIMM riser cards are disclosed. The DIMM riser cards include a printed circuit board ('PCB') having a first edge, a second edge, and one or more faces. The first edge of the PCB is configured for insertion into a main board DIMM socket mounted on a main board. The first edge also includes electrical traces that electrically couple to a memory bus upon insertion into the main board DIMM socket. The DIMM riser cards also include an angled DIMM socket mounted on one face of the PCB. The angled DIMM socket is configured to accept a DIMM at an angle not perpendicular to the PCB and electrically couple the DIMM to the memory bus through the electrical traces of the first edge. The DIMM riser cards also include a straddle mount DIMM socket mounted on the second edge of the PCB. The straddle mount DIMM socket is configured to accept a DIMM and electrically couple the DIMM to the memory bus through the electrical traces on the first edge of the PCB.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 5 sets forth a flow chart illustrating an exemplary method for manufacturing a DIMM riser card according to embodiments of the present invention.

DETAILED DESCRIPTION OF EXEMPLARY EMBODIMENTS

Figure 1:
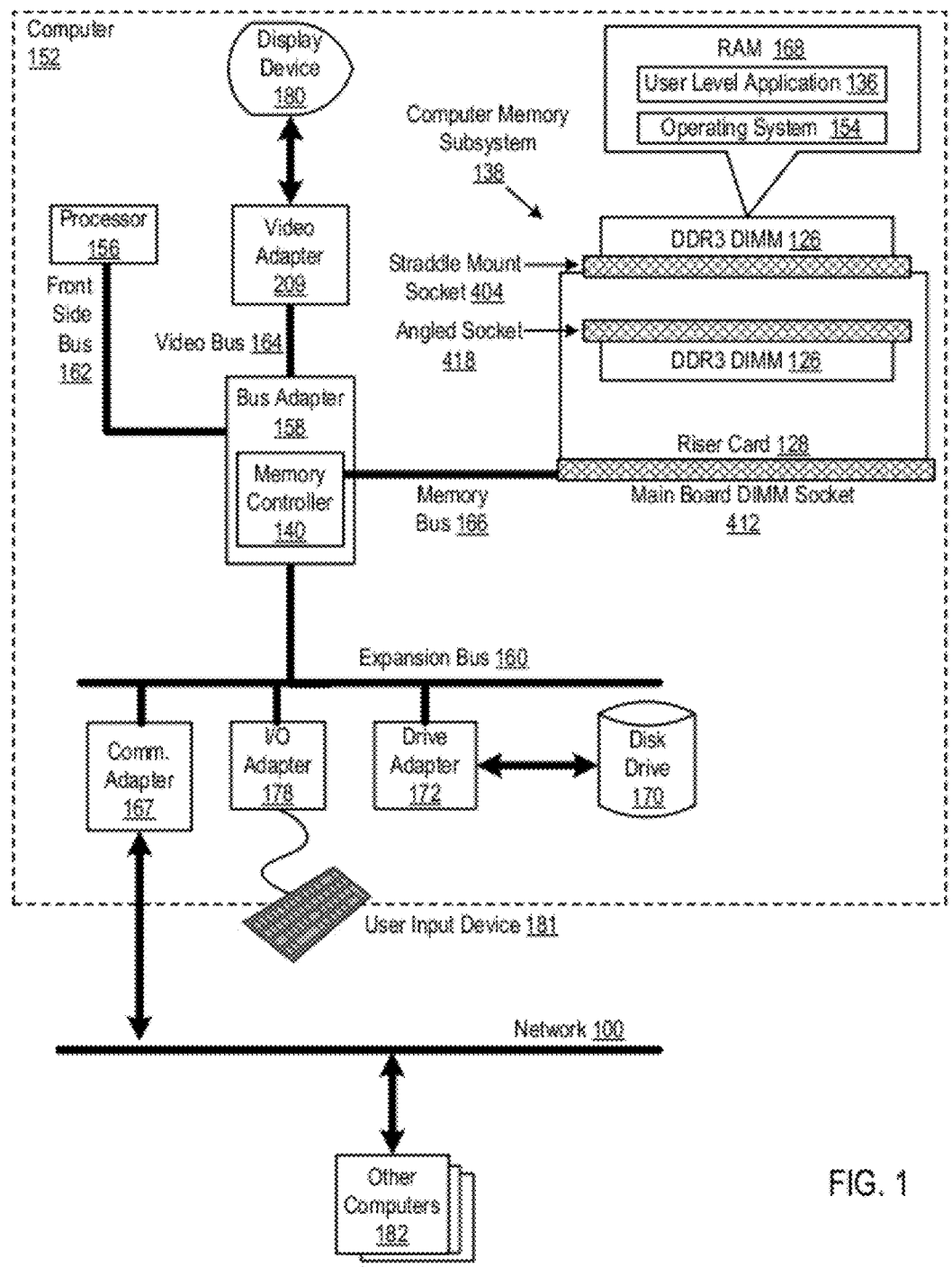
FIG. 1 sets forth a block diagram of automated computing machinery comprising an exemplary computer having a DIMM riser card configured according to embodiments of the present invention.

Exemplary Dual In-line Memory Module ('DIMM') riser cards, computer systems configured with DIMM riser cards, and methods of manufacturing DIMM riser cards according to embodiments of the present invention are described with reference to the accompanying drawings, beginning with FIG. 1. FIG. 1 sets forth a block diagram of automated computing machinery comprising an exemplary computer (152) having a DIMM riser card configured according to embodiments of the present invention. The computer (152) of FIG. 1 includes at least one computer processor (156) or 'CPU' as well as a random access memory ('RAM') (168) in a computer memory subsystem (138).

The RAM (168) in the example computer memory subsystem (138) of FIG. 1 is implemented as a number of Double Data Rate Three ('DDR3') Synchronous dynamic RAM ('SDRAM') DIMMs. DDR3 SDRAM is a RAM interface technology typically used for high bandwidth storage of the working data of a computer or other digital electronic devices. DDR3 is part of the SDRAM family of technologies and is one of the many DRAM implementations. DDR3 provides the ability to transfer at twice the data rate of DDR2, thus enabling higher bus rates and higher peak rates than earlier memory technologies. In addition, the DDR3 standard allows for chip capacities of 512 megabits to 8 gigabits, effectively enabling a maximum memory module size of 16 gigabytes. A DIMM is a series of DRAM integrated circuits. These circuits, called 'modules,' are mounted on a printed circuit board and designed for use in personal computers, workstations and servers. The main difference between Single In-line Memory Modules ('SIMMs') and DIMMs is that DIMMs have separate electrical contacts on each side of the module, while the contacts on SIMMs on both sides are redundant. Another difference is that standard SIMMs have a 32-bit data path, while standard DIMMs have a 64-bit data path. DDR3 SDRAM DIMMs are depicted in the example computer memory subsystem (138) of FIG. 1 for clarity of explanation, not for limitation. Readers of skill in the art will immediately recognize that any DIMM type may be implemented in DIMM riser cards configured in accordance with embodiments of the present invention.

The computer memory subsystem of FIG. 1 includes a memory controller (140) mounted on a main board. In the example of FIG. 1, the memory controller is implemented as part of a bus adapter (158). A memory controller is a digital circuit which manages the flow of data going to and from the main memory. It can be a separate chip or integrated into another chip, such as on the die of a microprocessor. A main board, sometimes called a motherboard, is a central PCB in many modern computers. A main board, for example, may hold many of the crucial components of the system, while providing connectors for other peripherals. A main board is sometimes alternatively known as a system board, a logic board, and sometimes shortened to mobo.

The computer memory subsystem (138) of FIG. 1 also includes a main board DIMM socket (412). A DIMM socket as the term is used in this specification refers to a receptacle configured to receive a DIMM and electrically couple the DIMM to a memory bus. A DIMM socket may be attached to a PCB using a through-hole technique, a surface mount technique, inserting pins of the DIMM socket into a connector, or in other ways as will occur to readers of a skill in the art. The 'main board' DIMM socket is a DIMM socket that connects DIMMs received in the main board DIMM socket to the memory bus of the main board.

The computer memory subsystem (138) of FIG. 1 also includes DIMM riser card (128) inserted into the main board DIMM socket (412). A riser card is a PCB that picks up a number of signal lines, often bussed, via a single connector, such as an edge connector on a main board and distributes the signal lines via dedicated connectors on the card. In the example of FIG. 1, the DIMM riser card (128) includes a printed circuit board ('PCB') having a first edge, a second edge, and one or more faces. The first edge of the DIMM riser card is inserted into the main board DIMM socket (412). The first edge includes electrical traces that electrically couple to the memory bus through the main board DIMM socket (412).

The DIMM riser card (128) in the example of FIG. 1 also includes an angled DIMM socket (418) mounted on one face of the PCB. The angled DIMM socket (418) is configured to accept a DIMM (126) at an angle not perpendicular to the PCB. The angled DIMM socket (418) is also configured to electrically couple the DIMM (126) to the memory bus (166) through the electrical traces of the first edge of the DIMM riser card PCB. The DIMM riser card (128) also includes a straddle mount DIMM socket (404) mounted on the second edge of the PCB. The straddle mount DIMM socket (404) is configured to accept a DIMM (126) and electrically couple the DIMM to the memory bus (166) through the electrical traces on the first edge of the PCB of the DIMM riser card (128).

In some example embodiments, the computer memory subsystem (138) may include a number of main board DIMM sockets and DIMM riser cards with angled and straddle mount sockets. In such an embodiment, the computer system may have a greater memory density than a computer system having riser cards without angled DIMM sockets. As explained in greater detail below with respect to FIGS. 2 and 3, DIMM riser cards with angled DIMM sockets may be located closer to one another than DIMM riser cards without angled DIMM sockets. As such, a computer system employing DIMM riser cards with angled DIMM sockets may have a greater memory density—more computer memory per unit of area—than a computer system that employs DIMM riser cards without angled DIMM sockets.

The computer memory subsystem (138) of FIG. 1 includes a memory bus (166) coupling the memory controller (140) and the main board DIMM socket (412). That is, the DIMMs (126) of the computer memory subsystem (138) are connected through the main board DIMM socket (412), to the high speed memory bus (166) and bus adapter (158), to the processor (156), and to other components of the computer (152).

Stored in RAM (168) is a user level application (136), a module of computer program instructions for carrying out user level data processing tasks. Examples of user level applications include word processor, spreadsheet applications, multimedia library applications, database management applications, image processing applications, and so on as will occur to readers of skill in the art. Also stored in RAM (168) is an operating system (154). Operating systems useful in computers having DIMM riser cards configured in accordance with embodiments of the present invention include UNIX™ Linux™ Microsoft XP™ AIX™, IBM's i5/OS™ and others as will occur to those of skill in the art. The operating system (154) and user level application (136) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that include DIMM riser cards configured in accordance with embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers having DIMM riser cards configured in accordance with embodiments of the present invention include modems for wired dial-up communications, Ethernet (IEEE 802.3) adapters for wired data communications network communications, and 802.11 adapters for wireless data communications network communications.

The arrangement of adapters, processors, networks, computers, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
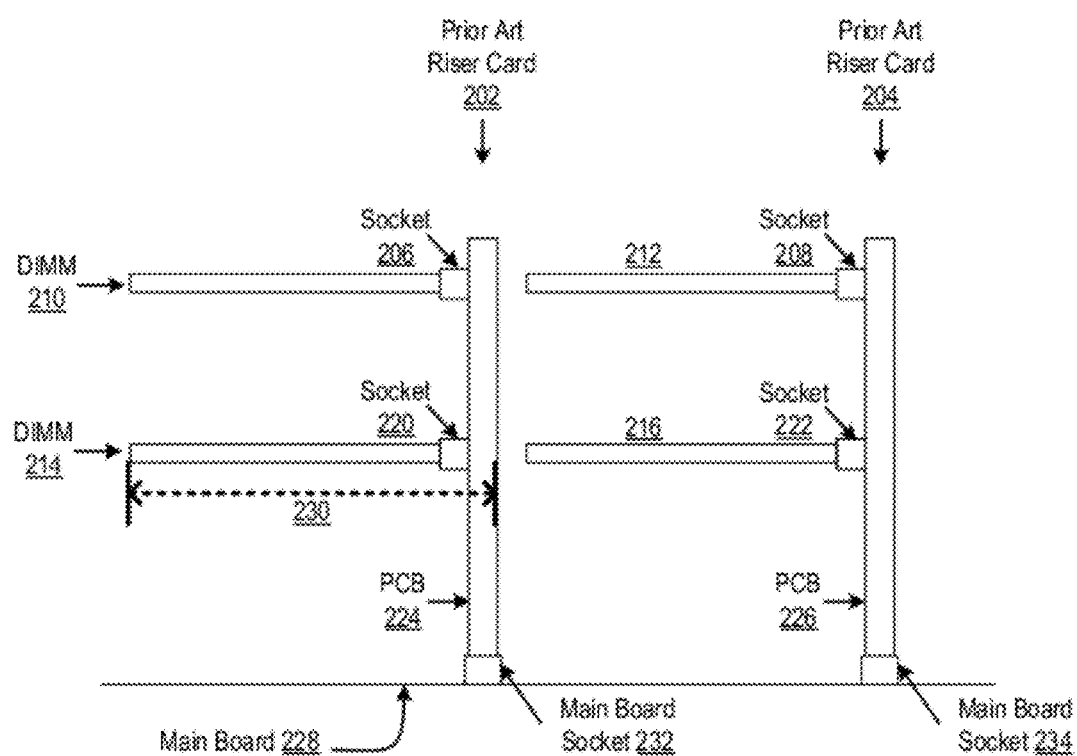
FIG. 2 sets forth a line drawing of a computer memory subsystem of the prior art.

For further explanation, FIG. 2 sets forth a line drawing of a computer memory subsystem of the prior art. The prior art computer memory subsystem of FIG. 2 includes two prior art riser cards (202, 204) connected to a main board (228) via main board sockets (232, 234). Prior art riser card (202) is configured with two DIMM sockets (206, 220) each of which electrically couples a DIMM (210, 214) to one or more signal lines on a PCB (224). Prior art riser card (204) is configured with two DIMM sockets (208, 222) each of which electrically couples a DIMM (212, 216) to one or more signal lines on a PCB (226). The sockets (206, 220, 208, 222) are perpendicular to the PCB (224, 226) on which the sockets are mounted. The DIMMs are likewise installed in the sockets parallel to riser card in which the DIMM is installed and parallel to the main board. The distance (230) from the top of an installed DIMM (214) to the opposite face of the PCB (224) is greater than the height of the DIMM itself. As such, the riser cards (202, 204) must be spaced at a distance greater than the distance (230) and greater from the top of an installed DIMM (214) to the opposite face of the PCB (224)—effectively greater than the height of a DIMM.

Figure 3:
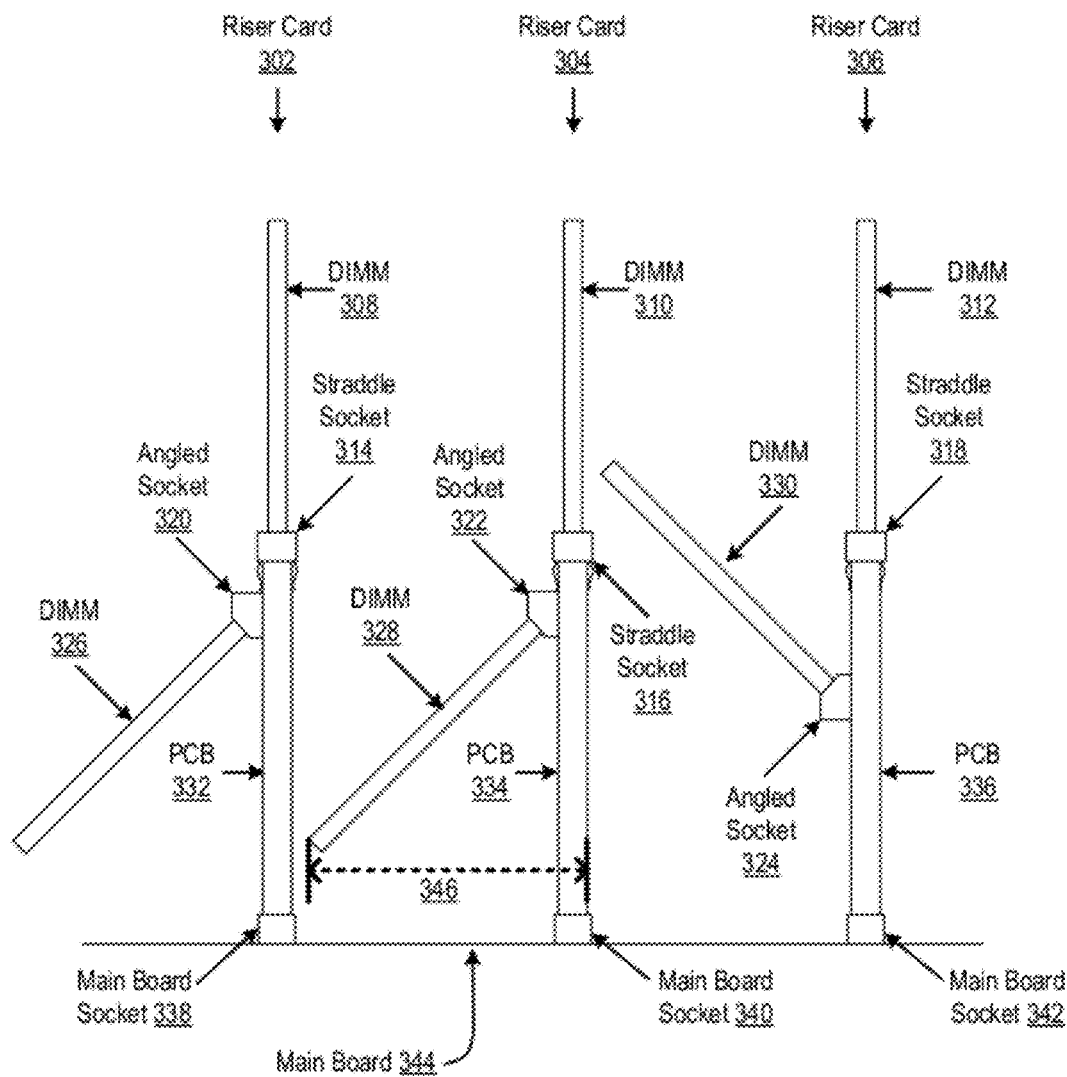
FIG. 3 sets forth a line drawing of an exemplary computer memory subsystem configured in accordance with embodiments of the present invention.

For further explanation, FIG. 3 sets forth a line drawing of an exemplary computer memory subsystem configured in accordance with embodiments of the present invention. FIG. 3 differs from FIG. 2 in that the example computer memory subsystem of FIG. 3 includes three riser cards (302, 304, 306) with each riser card including a PCB (332, 334, 336) having a first edge, a second edge, and one or more faces. The first edge is inserted into a main board DIMM socket (338, 340, 342) mounted on a main board (344). The first edge includes electrical traces that electrically couple to a memory bus upon insertion into the main board DIMM socket (338, 340, 342).

Each of the DIMM riser cards (302, 304, 306) includes an angled DIMM socket (320, 322, 324) mounted on one face of the PCB (332, 334, 336). The angled DIMM socket (320, 322, 324) accepts a DIMM (326, 328, 330) at an angle not perpendicular to the PCB. In the example of FIG. 3, DIMM (326) and DIMM (328) are directed at angle pointing toward the main board (344) while DIMM (330) is directed at an angle point away from the main board (344). That is, DIMM riser cards configured in accordance with embodiments of the present invention may include angled DIMM socket that accept a DIMM at an angle that directs the DIMM toward the first edge of the PCB or that accept a DIMM at an angle that directs the DIMM toward the second edge of the PCB. Each angled DIMM socket (320, 322, 324) is also configured to electrically couple the DIMM (326, 328, 330) to the memory bus through the electrical traces of the first edge of the PCB (332, 334, 336).

Each of the DIMM riser cards (302, 304, 306) also includes a straddle mount DIMM socket (314, 316, 318) mounted on the second edge of the PCB (332, 334, 336). The term 'straddle mount' describes the type of mounting of the DIMM socket—by straddling pins from the bottom of the straddle mount DIMM socket over the second edge of the riser card. The pins of the straddle mount DIMM socket may insert into through holes, be soldered onto pads or electrical traces on the PCB, or may otherwise be electrically coupled to the electrical traces of the PCB. The straddle mount DIMM sockets (314, 316, 318) accept a DIMM (308, 310, 312) and electrically couple the DIMM (308, 310, 312) to the memory bus through the electrical traces on the first edge of the PCB.

The example computer memory subsystem of FIG. 3 also differs from the prior art subsystem of FIG. 2 in that the distance (346) from the top of a DIMM (328) installed in an angled DIMM socket (322) to the opposite face of the PCB (334) is less than the distance (230 on FIG. 2) from the top of a DIMM (214 on FIG. 2) installed in a perpendicular DIMM socket (220 on FIG. 2) to the opposite face of the PCB (224 on FIG. 2). That is, the effective width of a DIMM riser card having a DIMM installed in an angled DIMM socket is less than the effective width of a DIMM riser card having a DIMM installed in perpendicular DIMM socket. As such, DIMM riser cards having an angled DIMM socket may be configured physically closer to one another than DIMM riser cards having perpendicular DIMM sockets. A computer memory subsystem including DIMM riser cards with angled DIMM sockets may be configured with a greater memory density—number of DIMM riser cards per unit of area—than a computer memory subsystem that includes DIMM riser cards without angled DIMM sockets.

Figure 4:
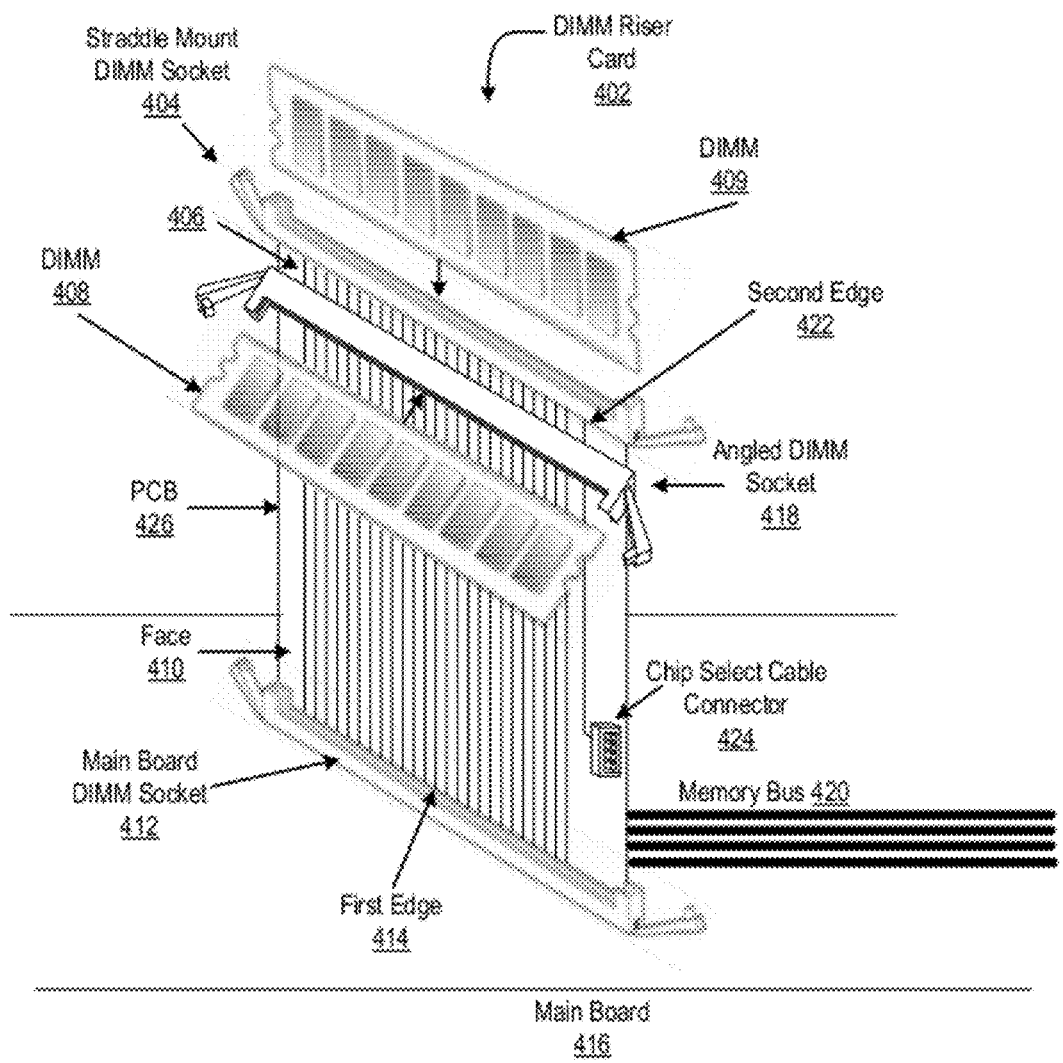
FIG. 4 sets forth a line drawing of an example DIMM riser card configured in accordance with embodiments of the present invention.

For further explanation, FIG. 4 sets forth a line drawing of an example DIMM riser card (402) configured in accordance with embodiments of the present invention. The example DIMM riser card (402) of FIG. 4 includes a PCB (426). The PCB (426) has a first edge (414), a second edge (422), and one or more faces (410). The first edge (414) is inserted into a main board DIMM socket (412) mounted on a main board (416). The first edge (414) includes electrical traces that electrically couple to a memory bus (420) upon insertion into the main board DIMM socket (414).

The example DIMM riser card (402) of FIG. 4 also includes an angled DIMM socket (418) mounted on one face (410) of the PCB (426). The angled DIMM socket (418) is configured to accept a DIMM (408) at an angle not perpendicular to the PCB. The angled DIMM socket (418) is also configured to electrically couple the DIMM (408) to the memory bus (420) through the electrical traces of the first edge (414).

The example DIMM riser card (402) of FIG. 4 also includes a straddle mount DIMM socket (404) mounted on the second edge (422) of the PCB (426). The straddle mount DIMM socket (404) is configured to accept a DIMM (409) and electrically couple the DIMM (409) to the memory bus (420) through the electrical traces on the first edge (414) of the PCB (426).

In the example DIMM riser card (402) of FIG. 4, the angled DIMM socket (418) and the straddle mount DIMM socket (404) are located adjacent to one another on the PCB such that stub effect induced by electrical traces (406) between the angled DIMM socket (418) and the straddle mount DIMM (404) is reduced when no DIMM is installed in the straddle mount DIMM socket (404). The electrical traces (406) electrically couple the downstream straddle mount DIMM socket to the upstream Angled DIMM socket which is electrically coupled through the traces on the first edge (414) of the PCB (426) and through the main board DIMM socket (412) to the memory bus (420). When no DIMM is installed in the straddle mount DIMM socket (404), the traces (406) between the angled DIMM socket (418) and the straddle mount DIMM socket (404) may function as stub antennas and introduce interference, called stub effect, into electrical signals carried on the traces of the PCB. Stub effect may be reduced by reducing the length of the traces. In the example DIMM riser card (402) of FIG. 4, the length of the traces is reduced by physically locating the angled DIMM socket (418) near the straddle mount DIMM socket.

The example DIMM riser card (402) of FIG. 4, also includes a chip select connector (424) electrically coupled to one or more DIMMs installed on the DIMM riser card. A chip select signal, also called slave select, is the name of a control line in digital electronics used to select one chip out of several connected to the same computer bus usually utilizing the three-state logic. For DIMMs, the chip select may be used to select a set of memory modules on the DIMM to write to or read from. The example chip select connector (424) of FIG. 4 is capable of receiving a chip select cable that couples one or more chip select signal lines of the main board (416) to a DIMM (408, 409) installed on the DIMM riser card (402). The example straddle mount DIMM socket (404) and the angled DIMM socket (418) of the DIMM riser card (402) of FIG. 4 may be configured to accept a dual die, quad rank, two DIMM per channel, double data rate three (DDR3) DIMM.

For further explanation, FIG. 5 sets forth a flow chart illustrating an exemplary method for manufacturing a DIMM riser card according to embodiments of the present invention. The method of FIG. 5 includes configuring (502) a PCB having a first edge, a second edge, and one or more faces for insertion into a main board DIMM socket mounted on a main board. In the method of FIG. 5, configuring (502) a PCB for insertion into a main board DIMM socket includes etching electrical traces along the first edge that electrically couple to a memory bus upon insertion into the main board DIMM socket.

The method of FIG. 5 also includes mounting (506) to the second edge of the PCB a straddle mount DIMM socket. In the method of FIG. 5, the straddle mount DIMM socket is configured to accept a DIMM and electrically couple the DIMM to the memory bus through the electrical traces on the first edge of the PCB. Mounting (506) the straddle mount DIMM socket to the second edge of the PCB may be carried out in various ways including soldering the pins of the straddle mount DIMM socket to pads on opposite faces of the PCB of the DIMM riser card, where the pads are located near the second edge of the PCB of the DIMM riser card.

The method of FIG. 5 also includes mounting (504) on one face of the PCB an angled DIMM socket. In the method of FIG. 5, the angled DIMM socket is configured to accept a DIMM at an angle not perpendicular to the PCB. The angled DIMM socket electrically couples the DIMM to the memory bus through the electrical traces of the first edge of the PCB. Mounting (504) the angled DIMM socket on one face of the PCB may be carried out in various ways including, for example, inserting pins of the angled DIMM socket through through-holes on the PCB and soldering the pins to the through-holes, soldering pads of the DIMM socket to pads of the PCB, and in other ways as will occur to readers of skill in the art. In the method of FIG. 5, mounting (504) the angled DIMM socket on one face of the PCB includes mounting (510) the angled DIMM socket adjacent to the straddle mount DIMM socket to reduce stub effect induced by electrical traces between the angled DIMM socket and the straddle mount DIMM when no DIMM is installed in the straddle mount DIMM socket.

In the method of FIG. 5, mounting (504) the angled DIMM socket may include mounting (512) the angled DIMM socket to accept a DIMM at an angle that directs the DIMM toward the first edge of the PCB or mounting (514) the angled DIMM socket to accept a DIMM at an angle that directs the DIMM toward the second edge of the PCB. The angled DIMM socket may accept a DIMM at an angle such that a distance from the top of the DIMM to an opposite face of the DIMM riser card is greater than a distance from a top of a DIMM installed in a non-angled socket to an opposite face of a DIMM riser card.

The method of FIG. 5 also includes mounting (508) to the PCB a chip select connector. In the method of FIG. 5, the mounted chip select connector electrically couples to one or more DIMMs installed on the DIMM riser card. T chip select connector is also capable of receiving a chip select cable where the chip select cable couples one or more chip select signal lines of the main board to a DIMM installed on the DIMM riser card.

In view of the explanations set forth above, readers will recognize that the benefits of DIMM riser cards having an angled DIMM socket and a straddle mount DIMM socket according to embodiments of the present invention include:
  Greater memory density in computer memory subsystems; and
  A reduced amount of stub effect when a DIMM is not installed in a downstream DIMM socket.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A Dual In-line Memory Module ('DIMM') riser card, the DIMM riser card comprising:
  a printed circuit board ('PCB') having a first edge, a second edge, and one or more faces, the first edge configured for insertion into a main board DIMM socket mounted on a main board;
  an angled DIMM socket mounted on one face of the PCB, the angled DIMM socket configured to accept a DIMM at an angle not perpendicular to the PCB; and
  a straddle mount DIMM socket mounted on the second edge of the PCB, the straddle mount DIMM socket configured to accept a DIMM,
  wherein the angled DIMM socket and the straddle mount DIMM socket are located adjacent to one another such that stub effect induced by electrical traces between the angled DIMM socket and the straddle mount DIMM is reduced when no DIMM is installed in the straddle mount DIMM socket.

2. The DIMM riser card of claim 1 wherein a distance from a top of a DIMM installed in the angled socket to an opposite face of the DIMM riser card is greater than a distance from a top of a DIMM installed in a non-angled socket to an opposite face of the DIMM riser card.

3. The DIMM riser card of claim 1 further comprising a chip select connector electrically coupled to one or more DIMMs installed on the DIMM riser card, the chip select connector capable of receiving a chip select cable, the chip select cable coupling one or more chip select signal lines of the main board to a DIMM installed on the DIMM riser card.

4. The DIMM riser card of claim 1 wherein the angled DIMM socket is further configured to accept a DIMM at an angle that directs the DIMM toward the first edge of the PCB.

5. The DIMM riser card of claim 1 wherein the angled DIMM socket is further configured to accept a DIMM at an angle that directs the DIMM toward the second edge of the PCB.

6. The DIMM riser card of claim 1 wherein the straddle mount DIMM socket and the angled DIMM socket are configured to accept a dual die, quad rank, two DIMM per channel, double data rate three (DDR3) DIMM.

7. A method of manufacturing a Dual In-line Memory Module ('DIMM') riser card, the method comprising:
   configuring a printed circuit board ('PCB') having a first edge, a second edge, and one or more faces for insertion into a main board DIMM socket mounted on a main board;
   mounting on one face of the PCB an angled DIMM socket, the angled DIMM socket configured to accept a DIMM at an angle not perpendicular to the PCB; and
   mounting to the second edge of the PCB a straddle mount DIMM socket, the straddle mount DIMM socket configured to accept a DIMM,
   wherein the angled DIMM socket and the straddle mount DIMM socket are located adjacent to one another such that stub effect induced by electrical traces between the angled DIMM socket and the straddle mount DIMM is reduced when no DIMM is installed in the straddle mount DIMM socket.

8. The method of claim 7 wherein a distance from a top of a DIMM installed in the angled socket to an opposite face of the DIMM riser card is greater than a distance from a top of a DIMM installed in a non-angled socket to an opposite face of a DIMM riser card.

9. The method of claim 7 further comprising mounting to the PCB a chip select connector, the mounted chip select connector electrically coupled to one or more DIMMs installed on the DIMM riser card, the chip select connector capable of receiving a chip select cable, the chip select cable coupling one or more chip select signal lines of the main board to a DIMM installed on the DIMM riser card.

10. The method of claim 7 wherein mounting the angled DIMM socket further comprises mounting the angled DIMM socket to accept a DIMM at an angle that directs the DIMM toward the first edge of the PCB.

11. The method of claim 7 wherein mounting the angled DIMM socket further comprises mounting the angled DIMM socket to accept a DIMM at an angle that directs the DIMM toward the second edge of the PCB.

* * * * *